United States Patent [19]

Thomas

[11] 3,947,140

[45] Mar. 30, 1976

[54] CONNECTOR FOR TELESCOPING TUBULAR STICK MEMBERS

[75] Inventor: Morton I. Thomas, Monroe, N.Y.

[73] Assignee: Temco Products, Inc., Passaic, N.J.

[22] Filed: July 3, 1974

[21] Appl. No.: 485,547

[52] U.S. Cl. ............... 403/108; 135/50; 248/188.5; 248/403; 248/423; 403/325; 403/327; 403/379

[51] Int. Cl.$^2$ ............................................ F16D 1/12

[58] Field of Search .................... 135/49, 50, 51, 52; 403/108, 325, 327, 324, 378, 379; 128/75, 84 C, 84 R, 80 R, 80 G, 87; 248/188.5, 408, 423

[56] References Cited

UNITED STATES PATENTS

| | | | |
|---|---|---|---|
| 2,620,210 | 12/1952 | Wuster | 403/327 |
| 2,741,255 | 4/1956 | Neptune | 135/51 |
| 2,932,047 | 4/1960 | Johnston | 403/379 |
| 3,526,040 | 9/1970 | Young | 403/327 |
| 3,635,233 | 1/1972 | Robertson | 135/15 |
| 3,710,807 | 1/1973 | Ferry | 135/49 |
| 3,768,495 | 10/1973 | Smith | 135/50 |

FOREIGN PATENTS OR APPLICATIONS

| | | | |
|---|---|---|---|
| 1,057,251 | 2/1967 | United Kingdom | 135/3 R |

*Primary Examiner*—Werner H. Schroeder
*Assistant Examiner*—Conrad L. Berman
*Attorney, Agent, or Firm*—Stoll and Stoll

[57] ABSTRACT

A crutch construction for underarm and forearm crutches, wherein the handgrip is mounted, at least in part, forward of the longitudinal axis of the crutch, and the arm support is mounted, at least in part, rearward of said longitudinal axis. The arm support is adjustably mounted for movement at an angle within a range of about 5°–20° to said longitudinal axis. The thrust line of the crutch is located slightly forward of the longitudinal axis of the crutch. The handgrip is substantially centered relative to the thrust line of the crutch, and the longitudinal axis of the handgrip is substantially normal to said thrust line. The arm support is laterally adjustable relative to the handgrip for proper palm placement and wrist angulation and to enable to the user of the crutch to apply a forward rotational bias to the crutch sufficient to hold the arm support securely and comfortably against the arm of the user, but insufficient to render the crutch unstable.

The crutch construction herein claimed includes an adjustable spring-urged locking element which interlocks the respective movable parts and impresses a spring bias upon them to dampen relative movement between them.

2 Claims, 5 Drawing Figures

10
22
TL
LA
18
14
28
30
20
15
12
24
26
16
32
62
60
18a
40
42
44
46
48
50

CONNECTOR FOR TELESCOPING TUBULAR STICK MEMBERS

BACKGROUND OF THE INVENTION

1. Field of the Invention.

This invention relates to underarm and forearm crutches and such other tubular construction type hospital and patient appliances and equipment such as canes, walkers and commodes.

2. Description of the Prior Art.

Adjustable crutches embodying tubular construction are, of course, in common use. These crutches are extensible and contractible substantially along their longitudinal axes to either increase or decrease their length (height) in relation to the requirements of the individual users. In some cases, the handgrip and arm support are substantially centered relative to the longitudinal axis of the crutch. Illustrative are Murcott U.S. Pat. Nos. 3,133,551 and 3,157,187. In other cases, the handgrip and arm support are both offset from said longitudinal axis, forward thereof.

In the case of the Murcott patents, the centered relationship of the handgrip and arm support to the longitudinal axis of the crutch prevents the user from holding the handgrip in a comfortable, centered position. In consequence, the user tends to grasp the outer end of the handgrip, and this displaces the thrust line substantially forwardly of the longitudinal axis of the crutch, resulting in an excessive forward rotational bias which unbalances the crutch and fatigues the user. A similar condition obtains in the case of the crutches wherein both the handgrip and arm support are disposed forwardly of the longitudinal axis of the crutch. In such case, an excessive forward rotational bias develops, producing an unstable and fatiguing crutch design.

Commonly used on these adjustable crutches of the prior art are spring-urged lock buttons which lock the relatively movable parts together. These lock buttons do not, however, apply a spring load between the relatively movable parts, and since there is sufficient clearance for actuation of the lock buttons, the movable parts are not confined against relative vibratory movement and the like. This is true not only of adjustable crutches but also various other patient and hospital appliances and equipment made of tubular construction such as canes, walkers and commodes.

SUMMARY OF THE INVENTION

The present invention relates to underarm and forearm crutches of tubular construction. Essentially these crutches comprise a tubular upright, an adjustable extension piece at the upper end of the upright, a second extension piece at the lower end of the upright, a handgrip secured to the upright, and a forearm or underarm support mounted on the upper extension piece. By adjusting the lower extension piece relative to the upright, the effective length of the upright may be extended or reduced. This is also true of the extension piece at the upper end of the upright, and since the arm support is mounted on said upper extension piece, its height from the floor may be adjusted by adjusting either or both of the two extension pieces. Additionally, by adjusting the upper extension piece the spacing between the arm support and the handgrip may be altered to the requirements of the individual user of the crutch.

Thus far, the crutch construction described is conventional. However, the upper end of the upright of the present crutch is angled rearwardly and the handgrip is secured to said rearwardly angled upper section at such point that the handgrip extends, in part, forwardly of the longitudinal axis of the crutch and, in part, rearwardly of said longitudinal axis. Specifically, the present invention provides a crutch upright which is angularly offset at its upper end at an angle of about 5°–20° to the longitudinal axis of the main body of the upright. An extension piece is telescopically connected to said angularly offset upper end of the upright and an arm support — either forearm or underarm — is mounted on said extension piece. It is clear that telescopic movement of the extension piece relative to the upright will change the offset position of the arm support in relation to the longitudinal axis of the main body of the upright.

In the preferred form of the invention, the larger part of the handgrip extends forwardly of the longitudinal axis. The arm support is mounted on a telescopic extension of said rearwardly angled upper section, and it is disposed, at least in part, on the rearward side of the longitudinal axis of the crutch. The precise location of the arm support in relation to said longitudinal axis is determined by the direction and extent of the telescopic adjustment of said extension of the rearwardly angled upper section.

The result is that the handgrip can comfortably be held by the hand while the arm support is comfortably engaged by the arm. The offset relationship between the handgrip and longitudinal axis of the crutch, and the offset relationship between the arm support and said longitudinal axis, produce a condition of forward rotational bias which holds the arm support securely and comfortably against the arm of the user without rendering the crutch unstable. The crutch thrust line is located slightly forward of the longitudinal axis of the crutch.

Also important is the angular relationship of the handgrip to the thrust line of the crutch. The handgrip is substantially centered with respect to the thrust line and the longitudinal axis of the handgrip intersects the thrust line substantially at right angles.

Another important feature of the invention resides in the spring-urged lock button used to secure the telescopically joined parts in selected relative positions. This feature of the invention is applicable not only to crutches but also to canes, walkers, commodes and other patient and hospital appliances and equipment which embody telescopic tubular parts requiring adjustment in selected relative positions. Specifically, the spring-urged lock button is mounted on the inner tubular member for spring-urged engagement with the outer tubular member of a pair of telescopically joined tubular members. The outer tubular member is provided with a plurality of longitudinally spaced holes. The lock button is tapered for selective engagement with these holes. The larger end of the taper is greater in cross-sectional dimensions than the holes which the lock button engages. This enables the lock button to apply spring bias to the two tubular members to dampen any vibratory or other relative movement between them.

DETAILED DESCRIPTION OF PREFERRED EMBODIMENTS OF INVENTION

Figures 1, 2, 3, 4, 5:
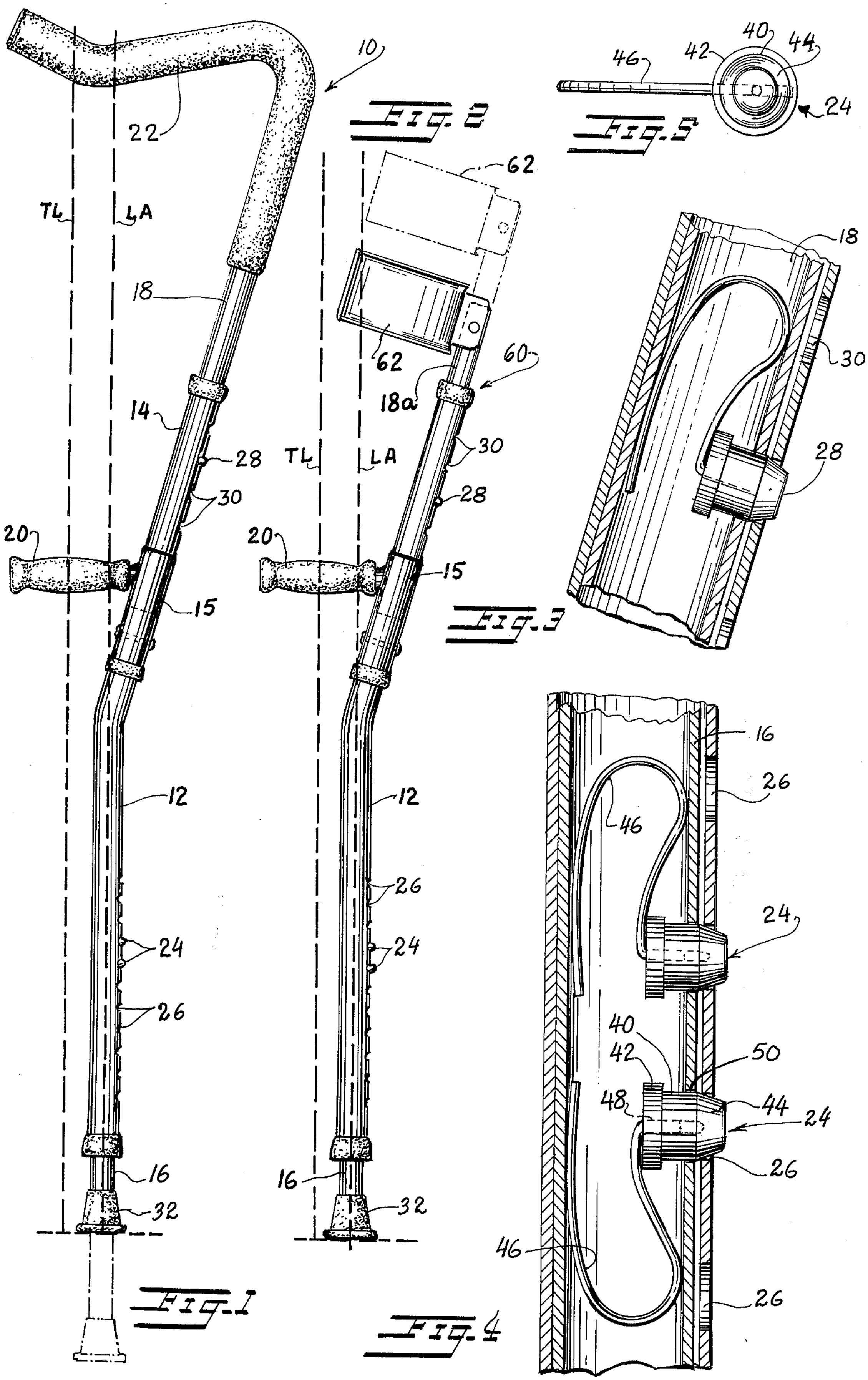
FIG. 1 is a side view of an underarm crutch made in accordance with the principles of this invention.
FIG. 2 is a similar view of a forearm crutch made in accordance with the invention.
FIG. 3 is an enlarged fragmentary section showing the lock button mechanism of either crutch shown in FIGS. 1 and 2, said lock button performing the function of interlocking the upper end of the main body of the crutch with the upper extension piece thereof.
FIG. 4 is a view similar to that of FIG. 3, but showing a dual lock button construction as used to interlock the lower end of the main body of the crutch and the lower extension piece thereof.
FIG. 5 is a face view of one of the lock buttons shown in FIG. 4, this being equivalent to a face view of the lock button shown in FIG. 3.

Referring now to the details of one preferred form of this invention, as illustrated in FIG. 1 of the drawing, it will be observed that underarm crutch 10 has a tubular upright 12 with an angularly bent upper end 14, an extension tube 16 telescopically connected to the lower end of said tubular upright 12, a second extension tube 18 telescopically connected to the angularly bent upper end 14 of upright 12. The angularly bent upper end 14 of the tubular upright 12 may be integral therewith or, as shown in the drawing, it may consist of a straight length of tubing joined by a sleeve coupling 15 to an angularly bent upper end of the main body of upright 12. The straight length of tubing may be welded or otherwise secured to coupling 15. The coupling may be riveted or otherwise secured to the angularly bent upper end of upright 12. For the purposes of this specification, coupling 15 and the straight length of tubing which is welded to it will be considered to comprise the angularly bent upper end 14 of tubular upright 12.

It will be observed that a handgrip 20 is secured to said angularly bent upper end 14 and, more particularly, to coupling 15 thereof. Mounted on upper extension tube 18 is an underarm support 22. Spring-urged lock buttons 24, mounted in lower extension tube 16, are selectively engageable with holes 26 formed in upright 12, longitudinally thereof, a similar spring-urged lock button 28 is mounted in upper extension tube 18, and selectively engageable holes 30 are formed in the angularly bent upper end 14 of upright 12.

A conventional crutch tip 32 is attached to the lower end of the lower extension tube 16. Handgrip 20 may be conventional in design, and this is equally true of underarm support 22. The entire construction may also be conventional in the sense that elements 12, 16 and 18 are telescopically and adjustably joined tubes. But there are two important features which are not conventional and which comprise the claimed invention.

The first of these features resides in the angular relationship between the main body of upright 12 and its angularly extending upper end 14. The angle between upper end 14 and the longitudinal axis of the main body of upright 12 should range from about 5° to about 20°. In the preferred form of this invention a 12° angle is used, but this is purely illustrative. It will be understood that when the upper extension piece 18 is moved axially of the angular upper end 14 the distance between handgrip 20 and underarm support 22 is changed, depending on the direction and extent of movement of said extension piece 18 in relation to said angular upper end 14.

But there is another change in positional relationship. Handgrip 20 remains fixed in relation to the longitudinal axis LA of the main body of upright 12. Underarm support 22, however, moves laterally of said longitudinal axis as it moves axially of the angular upper end 14 of said upright. Stated differently, underarm support 22 may be offset to a greater or lesser degree from the longitudinal axis LA of the main body of upright 12 by simply adjusting extension piece 18 longitudinally of angular upper end 14 of the upright.

It will be understood that, in the typical operative condition and relationship of parts of the crutch under description, as illustrated in FIG. 1 of the drawing, the major part of handgrip 20 extends on the forward side of longitudinal axis LA, while the major part of underarm support 22 extends on the rearward side of said longitudinal axis. Since the major part of the handgrip is thereby positioned forward of the underarm support, the handgrip is comfortably held by the hand while the underarm support is comfortably engaged by the arm. In this connection, it will be noticed that the longitudinal axis of the handgrip is substantially perpendicular to the longitudinal axis of the upright.

It will also be understood that the lateral relationship between the handgrip and underarm support produces a slight forward rotational bias about the fulcrum of crutch tip 32. This forward bias is sufficient to hold the underarm support in firm engagement with the underarm of the user, but it is insufficient to reduce the stability of the crutch and fatigue the user. The result is a thrust line TL which extends slightly forward of longitudinal axis LA.

The second important feature of this invention resides in the configuration and function of lock buttons 24 and 28. It will be seen in FIGS. 3 and 4 of the drawing that lock buttons 24 and 28 are identical and that a description of lock buttons 24 will also describe lock buttons 28. It will be observed that lock buttons 24 comprise a generally cylindrical shank 40, an enlarged head or shoulder 42 at the inner end of cylindrical shank 40, a conically tapered tip 44 at the outer end of said cylindrical shank, and a bowed or looped spring 46 projecting at one end into a slot 48 in said head and shank.

In the preferred form of this invention two lock buttons 24, instead of one, are used for added strength, but where a single such lock button suffices, as in the case of a child's crutch, only a single lock button is used. As shown in FIG. 4, one hole 50 is formed in extension tube 16 (or 18 as the case may be) for each lock button, and such hole or holes are registrable with holes 26 (or 30, as the case may be) formed in the tubular upright 12 (or its angled upper end 14). Normally occupying each hole 50 is the cylindrical shank 40 of one of said lock buttons. The head 42 and bowed or looped spring 46 are positioned within extension tube 16 (or 18), and it will be observed that said spring engages the inner wall of the tube opposite hole 50 to confine the lock button to said tube while impressing a radially outward spring bias thereon. Head 42 of the lock button is larger than hole 50, precluding ejection of the lock button therethrough under the action of the spring.

The structure of the lock button, including the spring which urges it radially outwardly, is conventional except for the tapered tip 44. This tapered tip is engageable with the peripheral edge which defines holes 26 (and 30). The smaller cross-sectional dimensions of tapered tip 44 are smaller than the diameter of these holes, and to that extent the button is adapted to project into them. The cross-sectional dimensions of the larger end of tapered tip 44 are larger than the diameter of the holes, and consequently engage the peripheral edges which define them. Since the button is spring-urged in radially outward direction, the effect is to impress a spring bias between the outer tube (tubular upright 12 or its angularly bent upper end 14) and the inner tube (lower extension tube 16 or upper extension tube 18). The outer and inner tubes are thereby held by spring action against lateral vibratory movement or the like.

This same lock button feature is equally applicable to other telescopic tubular structures of other patient and hospital appliances and equipment such as canes, walkers, commodes and the side rails of beds. This aspect of the invention is clearly not intended to be limited to crutches.

The foregoing description relates to a crutch having an underarm support. The same description applies equally to a like crutch 60 (FIG. 2) having a forearm support 62 mounted on an extension tube 18*a*. This forearm support may take the form of a conventional open-sided cuff or any other conventional configuration. In all other respects crutch 60 may correspond to crutch 10 and like parts are given like reference characters in the drawing.

The foregoing is illustrative of preferred forms of the invention, and it will be understood that design modifications and improvements may be built into the described appliance, within the broad principles of the invention and the broad scope of the appended claims.

I claim:

1. An adjustable telescopic connection for tubular construction hospital and patient appliances and equipment, such as crutches, canes, walkers and commodes, said adjustable telescopic connection comprising:

a. inner and outer telescopically joined, slidably adjustable, tubes b. a plurality of spaced sharp edged holes formed in the outer of said tubes, longitudinally thereof, each hole being defined by a peripheral sharp edge at substantially right angles to the length of the outer tube, c. a hole formed in the inner of said tubes for selective registration with the holes in the outer tube, d. the diameter of the hole in the inner tube being larger than the diameter of the holes in the outer tube, e. a radially extending lock button mounted in the inner tube and spring-urged radially outwardly through the hole in said inner tube into selective engagement with said sharp edge of the holes in the outer tube, f. said lock button having a generally conically, tapered tip which extends radially outwardly from said inner tube, g. stop means provided at the inner end of said lock button to prevent radial outward dislodgement of said lock button from said inner tube, h. the relative cross-sectional dimensions of said lock button and the holes in said inner and outer tubes being such that the lock button, outward of the stop means, is freely and closely received through the hole in said inner tube, the generally conically, tapered tip of the lock button being received in locking engagement with the peripheral edge which defines the selected hole in the outer tube, impressing an outward spring bias on said outer tube, said stop means being out of engagement with the inner tube, i. the spring bias being sufficiently strong to effect a movement dampening engagement between said tubes along the portions thereof opposed from the holes.

2. A construction in accordance with claim 1 wherein said lock button has a cylindrical shank between the stop means and the tapered tip.

* * * * *